(12) United States Patent
Appanna

(10) Patent No.: US 9,166,904 B2
(45) Date of Patent: **\*Oct. 20, 2015**

(54) METHOD AND APPARATUS FOR TRANSFERRING BGP STATE INFORMATION DURING ASYNCHRONOUS STARTUP

(75) Inventor: Chandrashekhar Appanna, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 1718 days.

This patent is subject to a terminal disclaimer.

(21) Appl. No.: 11/222,523

(22) Filed: Sep. 8, 2005

(65) Prior Publication Data

US 2007/0064698 A1    Mar. 22, 2007

(51) Int. Cl.
*H04L 12/701* (2013.01)
*H04L 12/715* (2013.01)
*H04L 12/703* (2013.01)
*H04L 12/707* (2013.01)

(52) U.S. Cl.
CPC .............. *H04L 45/22* (2013.01); *H04L 45/00* (2013.01); *H04L 45/04* (2013.01); *H04L 45/28* (2013.01)

(58) Field of Classification Search
CPC .......... H04L 45/00; H04L 45/04; H04L 45/28
USPC ................... 370/392, 217; 709/238
See application file for complete search history.

(56) References Cited

U.S. PATENT DOCUMENTS

| | | | |
|---|---|---|---|
| 6,078,957 A * | 6/2000 | Adelman et al. | 709/224 |
| 6,910,148 B1 | 6/2005 | Ho et al. | |
| 7,003,692 B1 | 2/2006 | Banks et al. | |
| 7,236,453 B2 * | 6/2007 | Visser et al. | 370/219 |
| 7,292,535 B2 | 11/2007 | Folkes et al. | |
| 2001/0046215 A1 * | 11/2001 | Kim | 370/329 |
| 2001/0049731 A1 | 12/2001 | Kuusinen et al. | |

(Continued)

FOREIGN PATENT DOCUMENTS

EP    1 365 551 A1    11/2003

OTHER PUBLICATIONS

Rekhter et al., IETF 1771, "A Border Gateway Protocol 4 (BGP-4)", Mar. 1995.*

(Continued)

*Primary Examiner* — Jianye Wu
(74) *Attorney, Agent, or Firm* — Hickman Palermo Becker Bingham LLP

(57) ABSTRACT

A method of transferring application layer network information comprises the computer-implemented steps of electronically transferring, from a first electronic digital data processor to a second electronic digital data processor, one or more transport layer connections associated with one or more application layer sessions; creating and sending, to the second processor, one or more application layer messages that appear to initiate a new application session with a peer; creating and sending, to the second processor, one or more application update messages that transfer application data from the first processor to the second processor; repeating the creating and sending steps for all application layer sessions that are active at the first processor. One embodiment provides stateful switchover of BGP sessions when one BGP host in a redundant system restarts asynchronously with respect to another host, without problems associated with bulk transfer of BGP route information.

28 Claims, 4 Drawing Sheets

(56) References Cited

U.S. PATENT DOCUMENTS

| | | |
|---|---|---|
| 2003/0023892 A1 | 1/2003 | Giovanni |
| 2003/0056138 A1* | 3/2003 | Ren .................................. 714/4 |
| 2003/0084371 A1 | 5/2003 | Mongazon-Cazavet et al. |
| 2003/0140155 A1 | 7/2003 | Harvey et al. |
| 2003/0140167 A1 | 7/2003 | Harvey et al. |
| 2003/0218982 A1* | 11/2003 | Folkes et al. .................. 370/238 |
| 2004/0008700 A1 | 1/2004 | Visser et al. |
| 2004/0078625 A1* | 4/2004 | Rampuria et al. ................ 714/4 |
| 2004/0090913 A1 | 5/2004 | Scudder et al. |
| 2005/0078600 A1 | 4/2005 | Rusmisel et al. |
| 2005/0213498 A1 | 9/2005 | Appanna et al. |
| 2005/0265346 A1 | 12/2005 | Ho et al. |
| 2006/0159011 A1 | 7/2006 | Dalal et al. |
| 2006/0159076 A1 | 7/2006 | Bless et al. |
| 2006/0164974 A1* | 7/2006 | Ramalho et al. ............. 370/219 |
| 2006/0215547 A1 | 9/2006 | Koppol |
| 2006/0227723 A1* | 10/2006 | Vasseur et al. ................ 370/254 |
| 2009/0129261 A1 | 5/2009 | Visser et al. |

OTHER PUBLICATIONS

Rekhter et al., RFC 1771 "A Border Gateway Protocol 4 (BGP-4)", Mar. 1995.*

European Search Report received in Application No. 06836205.2 dated Dec. 15, 2009 (8 pages).

Current Claims of Application No. 06836205.2—Jan. 2010 (5 pages).

Y. Rekhter et al., "A Border Gateway Protocol 4 (BGP-4)" (RFC 1771), Internet Engineering Task Force, Mar. 1995, pp. 1-54.

T. Bates et al., "Multiprotocol Extensions for BGP-4" (RFC 2858), Internet Engineering Task Force, Jun. 2000, pp. 1-11.

European Patient Office, "Office Action" in foreign patent application No. 06836205.2-1525, dated Jun. 10, 2011, 5 pages.

Current Claims in European patent Application No. EP 06836205.2-1525, dated Jun. 2011, 7 pages.

Office Action from China for foreign patent application No. CN 200680038701.8 dated May 11, 2010.

Current claims in China patent application No. CN 200680038701.8 dated May 11, 2010.

International Searching Authority, "Notification of Transmittal of the International Search Report and the Written Opinion of the International Searching Authority, or the Declaration", International application No. PCT/US06/39099, dated Sep. 25, 2007, 8 pages.

Claims,, International application No. PCT/US06/39099, 5 pages. Sep. 25, 2007.

Office Action from EP for foreign patent application No. EPO 06836205.2 dated Mar. 18, 2010 (9 pgs).

Current Claims in EP foreign patent application No. EPO 06836205.2. dated Mar. 18, 1020.

* cited by examiner

METHOD AND APPARATUS FOR TRANSFERRING BGP STATE INFORMATION DURING ASYNCHRONOUS STARTUP

FIELD OF THE INVENTION

The present invention generally relates to providing fault-tolerant network service with Border Gateway Protocol. The invention relates more specifically to techniques for transferring state information among BGP hosts when one host re-starts out of synchronization with another host.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a path vector routing protocol for inter-Autonomous System routing. The function of a BGP-enabled network element (a BGP host or peer) is to exchange network reachability information with other BGP-enabled network elements. The most commonly implemented version of BGP is BGP-4, which is defined in RFC1771 (published by the Internet Engineering Task Force (IETF) in March 1995).

To exchange routing information, two BGP hosts first establish a peering session by exchanging BGP OPEN messages. The BGP hosts then exchange their full routing tables. After this initial exchange, each BGP host sends to its BGP peer or peers only incremental updates for new, modified, and unavailable or withdrawn routes in one or more BGP UPDATE messages. A route is defined as a unit of information that pairs a network destination with the attributes of a network path to that destination. The attributes of the network path include, among other things, the network addresses (also referred to as address prefixes or just prefixes) of the computer systems along the path. In a BGP host, the routes are stored in a Routing Information Base (RIB). Depending on the particular software implementation of BGP, a RIB may be represented by one or more routing tables. When more than one routing table represents a RIB, the routing tables may be logical subsets of information stored in the same physical storage space, or the routing tables may be stored in physically separate storage spaces.

As defined in RFC1771, the structure of a BGP UPDATE message accommodates updates only to Internet Protocol version 4 (IPv4) unicast routes. The Multiprotocol Extension for BGP defined in RFC2858 (published by IETF in June 2000) could accommodate updates to routing information for multiple Network Layer protocols, such as, for example, Internet Protocol version 6 (IPv6), Internetwork Packet eXchange (IPX), Appletalk, Banyan Vines, Asynchronous Transfer Mode (ATM), X.25, and Frame Relay. RFC2858 introduced two single-value parameters to accommodate the changes to the BGP UPDATE message structure: the Address Family Identifier (AFI) and the Subsequent Address Family Identifier (SAFI).

The AFI parameter carries the identity of the network layer protocol associated with the network address that follows next in the path to the destination. The SAFI parameter provides additional information about the type of the Network Layer Reachability Information that is included in a BGP UPDATE message, and the values defined for this parameter usually indicate a type of communication forwarding mechanism, such as, for example, unicast or multicast. While some of the AFI and SAFI values are reserved for private use, the AFI and SAFI values that can be commonly used by the public must be assigned through the Internet Assigned Numbers Authority (IANA). The AFI/SAFI combination is used by the software implementations of BGP to indicate the type of the BGP prefix updates, what format the prefix updates have, and how to interpret the routes included in the BGP UPDATE messages.

As networks grow more complex and the number of BGP routes maintained by a particular element increases, the consequences of the failure of a BGP host device, or the BGP process that it hosts, become more severe. For example, in some scenarios a BGP failure may require retransmission of a large amount of route information and re-computation of a large amount of network reachability information. Therefore, vendors of network gear and their customers wish to deploy BGP in a fault-tolerant manner.

One term sometimes applied to fault-tolerant information transfer techniques is "stateful switchover" or SSO. SSO is typically implemented with network elements that have dual route processors, each of which can host separate but duplicate instances of various software applications. One route processor is deemed Active and the other is deemed Standby. Implementing SSO for BGP hosts, processes or "speakers" typically requires periodically transferring duplicate copies ("checkpointing") of large amounts of data among pairs of hosts each respectively acting as an Active BGP speaker and a Standby BGP speaker. Further, when a failure occurs, the Standby BGP speaker almost always restarts operation asynchronously in relation to the Active BGP speaker. Consequently, all data accumulated by the Active BGP speaker must be transferred to the Standby BGP speaker before the Standby BGP speaker can start processing BGP UPDATE messages or perform other substantive functions.

However, such a bulk data transfer approach is inefficient, may not be sustainable as the volume of data grows, and is not extensible. For example, in the bulk data transfer approach, the data structures that are transferred must be converted to messages for purposes of inter-process communications. Therefore, all data structures have to be flattened; that is, pointers present in the data structures cannot be sent in the form of pointers. Further, as data structures change between versions of software, new messages and converter functions are necessary to provide SSO support between the different versions. Also, large amounts of code need to be written and maintained for providing the checkpointing support during asymmetric startup.

All the above drawbacks have seriously limited the success of any BGP SSO design and implementation. Thus, there is a clear need for an improved technique for transferring state information among BGP speakers that implement SSO.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
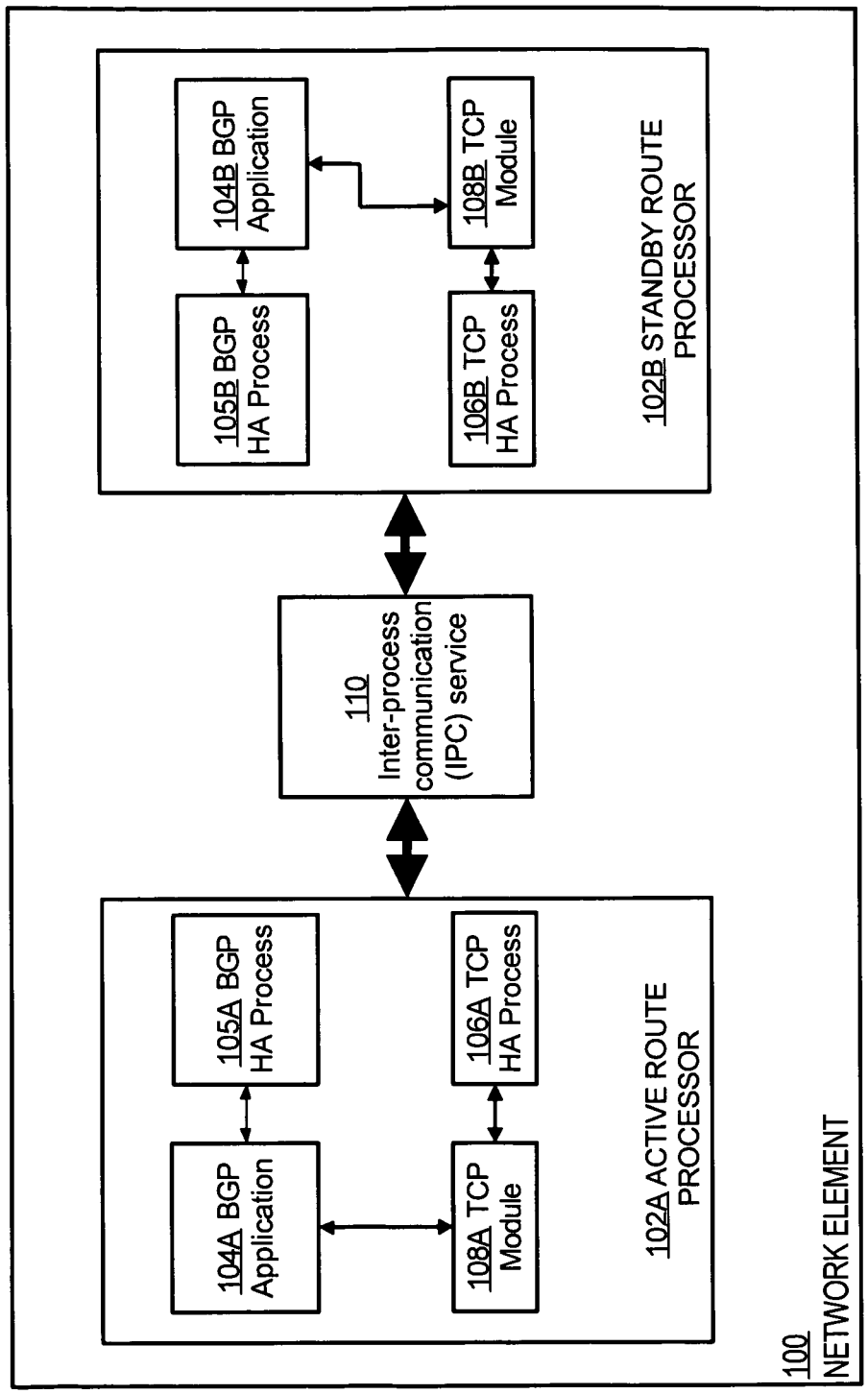
FIG. 1 is a block diagram that illustrates an overview of a network element that may be used to implement an embodiment.

A method and apparatus for transferring BGP state information during asynchronous startup is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Transferring BGP State Information During Asynchronous Restart
4.0 Implementation Mechanisms-Hardware Overview
5.0 Extensions and Alternatives

1.0 General Overview

The needs identified in the foregoing Background, and other needs and objects that will become apparent for the following description, are achieved in the present invention, which comprises, in one aspect, a method, comprising the computer-implemented steps of electronically transferring, from a first electronic digital data processor to a second electronic digital data processor, one or more transport layer connections associated with one or more application layer sessions; creating and sending, to the second processor, one or more application layer messages that appear to initiate a new application session with a peer; creating and sending, to the second processor, one or more application update messages that transfer application data from the first processor to the second processor; repeating the creating and sending steps for all application layer sessions that are active at the first processor.

One embodiment provides stateful switchover of BGP sessions when one BGP host in a redundant system restarts asynchronously with respect to another host, without problems associated with bulk transfer of BGP route information.

In one feature of this aspect, the first processor creates and sends, to the second processor, a mapping of a unique connection identifier to one or more session identifier values, and wherein the application layer messages and application update messages include the unique connection identifier. In another feature, the unique connection identifier is an initial sequence number that is obtained from a transport layer. In another feature, wherein each of the application layer messages and application update messages is encapsulated in a session transfer message that includes the unique connection identifier in a header field.

In still another feature, the application layer sessions are Border Gateway Protocol (BGP) sessions, and the application layer messages comprise a BGP OPEN message. In yet another feature, the application layer sessions are Border Gateway Protocol (BGP) sessions, and the application update messages are BGP UPDATE messages. In another feature, the application layer messages comprise a BGP OPEN message that duplicates another BGP OPEN message previously received from a BGP peer.

In one embodiment, the first processor and the second processor are route processors in a fault-tolerant network element. For example, the network element is any of a router and a switch in a packet-switched network.

In other aspects, the invention encompasses a computer apparatus and a computer-readable medium configured to carry out the foregoing steps.

2.0 Structural and Functional Overview

FIG. 1 is a block diagram that illustrates an overview of a network element that may be used to implement an embodiment. A network element 100 comprises an active route processor 102A and a standby route processor 102B arranged in a redundant or fault-tolerant configuration. In one embodiment, network element 100 is a dual-processor router or switch that participates in a packet-switched network or internetwork. Active route processor 102A hosts a TCP module 108A that runs or controls a TCP high-availability (HA) process 106A. Active route processor 102A also hosts a BGP application 104A that runs or controls a BGP HA process 105A. Standby route processor 102B hosts a TCP module 108B, BGP application 104B, TCP HA process 106B, and BGP HA process 105B.

TCP modules 108A, 108B and TCP HA processes 106A, 106B provide transport control protocol functionality. BGP application 104A, 104B and BGP HA processes 105A, 105B provide border gateway protocol functionality. In alternative embodiments, active route processor 102A and standby route processor 102B may host other protocols and applications. Thus, TCP modules 108A, 108B, TCP HA processes 106A, 106B, BGP HA processes 105A, 105B, and BGP application 104A, 104B are shown only as examples and not as requirements.

An inter-process communication (IPC) service 110 is coupled between active route processor 102A and standby route processor 102B, and provides a means for the route processors to exchange data and instructions.

The arrangement of FIG. 1 represents just one possible context for applying the approaches described herein. The approaches herein are generally applicable to any other context in which BGP state information needs to be transferred from one location to another.

Figure 3:
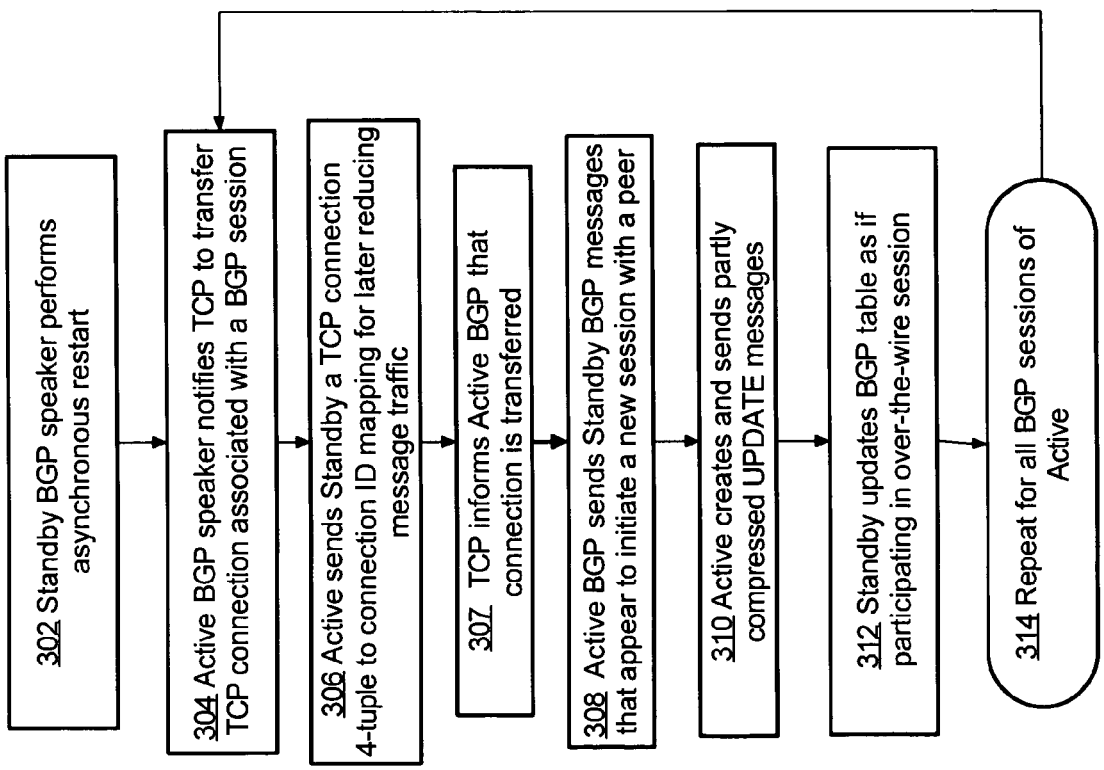
FIG. 3 is a flow diagram that illustrates a high level overview of one embodiment of a method for transferring BGP state information during asynchronous startup.

FIG. 3 is a flow diagram that illustrates a high level overview of one embodiment of a method for transferring BGP state information during asynchronous startup. FIG. 3 shows a general approach that can be used to accomplish BGP state transfer, and other sections below describe particular details that can be used in various embodiments.

At step 302, a standby BGP speaker performs an asynchronous restart. For example, a standby BGP process restarts after crashing or otherwise becoming unavailable, asynchronously with respect to an active BGP process that is managing active BGP sessions and route information. At step 304, the active BGP speaker transfers a TCP connection associated with a BGP session. Thus, a TCP connection underlying a particular BGP session is transferred to the standby BGP process.

At step 306, the active BGP speaker sends the standby BGP speaker a mapping for later reducing message traffic. The mapping provides a way to reduce the size of subsequent messages that are involved in transferring state information.

At step 308, the active BGP speaker sends one or more BGP OPEN or BGP ORG messages that appear to initiate a new session between the standby BGP speaker and a BGP peer. As a result, the standby BGP speaker conceptually thinks that it is starting a new session. At step 310, the active BGP speaker creates and sends one or more abbreviated BGP UPDATE messages that provide routes and other session information to the standby BGP speaker. Each message sent at step 310 is abbreviated or compressed in the sense that it uses a connection identifier to identify a session, rather than sending complete conventional session identifying information, although the UPDATE payload is not compressed. At step 312, the standby BGP speaker updates its BGP tables as if the standby BGP speaker is participating in an over-the-wire BGP session. The preceding steps are repeated for all BGP sessions of the active BGP speaker.

As a result, all active BGP session information can be transferred to a restarting BGP process, without the problems associated with past bulk data transfer approaches, by essentially fooling the standby BGP speaker into thinking that a new session is starting. Message compression techniques can be used as an optimization to reduce the size of the messages that are communicated between the active and standby BGP speakers.

3.0 Method of Transferring BGP State Information During Asynchronous Restart The following section describes details of a particular embodiment of the preceding general approach.

3.1 Implementation Example

Figure 2:
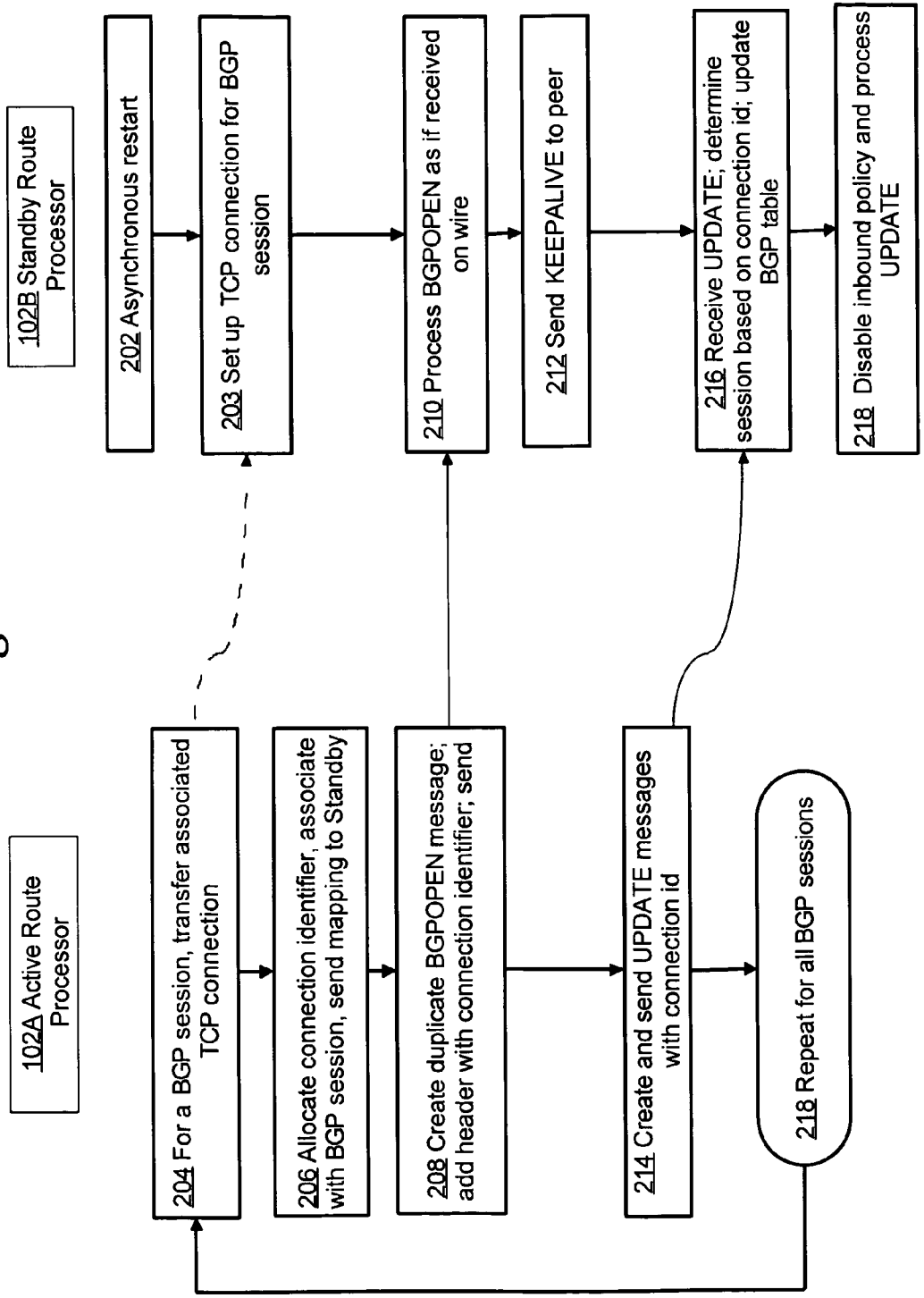
FIG. 2 is a flow diagram that illustrates one embodiment of a method for transferring BGP state information during asynchronous startup.

FIG. 2 is a flow diagram that illustrates one embodiment of a method for transferring BGP state information during asynchronous startup. FIG. 2 illustrates steps or functions that may be performed by two entities, such as active route processor 102A and standby route processor 102B, when a first entity is restarting asynchronously with respect to a second entity and needs to obtain BGP information from the second entity.

At step 202, standby route processor 102B performs a restart procedure asynchronously with respect to the active route processor 102A. Step 202 may occur when, for example, standby route processor 102B or BGP application 104B unexpectedly crashes or becomes unavailable and then restarts. However, the specific mode for restart at step 202 is not critical; what is important is that standby route processor 102B or BGP application 104B needs to acquire information from the active route processor 102A about existing active BGP sessions.

At step 203, standby route processor 102B sets up a TCP connection to carry the BGP session using the transferred TCP connection information that was received from the active route processor 102A. The standby route processor 102B then issues a notification message to active route processor 102A requesting transfer of BGP session information. For example, the standby route processor 102B sends an IPC message over IPC service 110 that signals the active route processor 102A to transfer BGP information.

At step 204, for a particular BGP session among one or more then currently active BGP sessions, the active route processor 102A transfers the associated TCP connection. Step 204 involves transferring a TCP connection on which that particular BGP session runs, using an existing TCP connection transfer mechanism having a form or functions as known in the art. The details of such a TCP connection transfer mechanism are beyond the scope of this disclosure, but are well known in the pertinent technical field. Step 204 can involve transferring all TCP connections for all active BGP sessions at one time.

At step 206, the active route processor 102A allocates a connection identifier value, associates the connection identifier value with the BGP session, and sends a mapping of the connection identifier and BGP session identifying information to the standby route processor 102B. The connection identifier value may be a number, an alphanumeric value, or any unique identifying value. The connection identifier also may be obtained from the TCP module 108A; for example, the connection identifier may be set to be the same as the initial sequence number (ISN) of the underlying TCP connection.

The BGP session information typically comprises a four-tuple of values including peer host IP values for the sending and receiving hosts and peer BGP port values for the sending and receiving host. The mapping associates the allocated connection identifier with the four-tuple of values. In an embodiment, in all subsequent messages the active route processor 102A specifies only the connection identifier rather than repeating the four-tuple of values to uniquely identify a session. This saves IPC bandwidth for the approach as a whole, and makes the approach far more scalable when an asynchronous restart requires transferring large numbers of route updates.

At step 208, the active route processor 102A creates a duplicate BGP OPEN message, adds a header carrying the allocated connection identifier value, and sends the duplicate BGP OPEN message to the standby route processor 102B. The BGP OPEN message may be sent using IPC service 110. The BGP OPEN message is "duplicate" in the sense that it recreates a BGP OPEN message as it was received from a peer at the active BGP speaker.

At step 210, the standby route processor 102B processes the BGP OPEN message. The standby route processor 102B then processes the BGP OPEN message as if receiving it from the wire, even though the standby route processor actually would have received the same message before it crashed or became unavailable. In one embodiment, the standby route processor 102B enqueues the BGP OPEN message onto the read-queue associated with the session, and then triggers the standby BGP application 104B to read the queue and process the packet as if it arrived on the wire.

Because the BGPOPEN message duplicates a previously sent BGPOPEN message, processing the message at step 210 causes the BGP application 104B of standby route processor 102B to progress through all conventional BGP states. In essence, the duplicate BGPOPEN message "fools" the BGP application 104B into processing what appears to be a new session. If the BGP OPEN message is accepted by the standby BGP application 104B, then the state of BGP for the specified peer will progress into the BGPS_OPENSENT and BGPS_OPENCONFIRM states. A BGP OPEN message initiated by the standby BGP application 104B is silently dropped. The capabilities of the active and standby BGP applications 104A, 104B, such as message versions, functional capabilities such as support for stateful switchover and route refreshing, etc., may be pre-negotiated using ISSU (initial state startup) or a similar approach; with such pre-negotiation, both BGP applications are assured to have the same capabilities.

However, if the BGP OPEN message is not accepted by the standby BGP application 104B, the BGP state for the current session will not progress to the "established" or BGPS_ESTAB state. Nevertheless, this fact provides a useful safeguard of the present approach, because the current approach does not require complicated verification mechanisms to ensure that the transfer will succeed. Instead, the approach utilizes existing BGP OPEN parsing mechanisms. If the BGP OPEN message is rejected, then all subsequent BGP messages as described herein for this session will not have any effect. If needed, the standby BGP application 104B can inform the active BGP application 104A about the problem by sending a withdraw message that includes the connection identifier.

As part of processing the BGP OPEN message, at step 212 the standby route processor 102B sends a BGP KEEPALIVE message to the peer BGP process at active route processor 102A. The message is enqueued in the BGP read queue for the standby BGP application 104B. This causes the BGP applications to reach the "established" state (BGPS_ESTAB) for the current session.

Subsequently, active route processor 102A creates and sends one or more BGP UPDATE messages that contain the connection identifier and pertinent route information. The BGP UPDATE messages created by the active route processor 102A represent all the route or path data previously received from the peer at the active BGP application 104A. The messages are encapsulated with the connection identifier.

At step 216, the standby route processor 102B receives the UPDATE messages, determines which session to update based on the connection identifier, and updates one or more BGP route tables, as appropriate. Thus, at the standby BGP application 104B the messages are processed as if the messages arrived on the wire. However, for all such messages, all inbound policy application is disabled at step 218. Further, the peer BGP node that is associated with each message is obtained based on the connection identifier that is present in the message. This approach ensures that the routing data is stored into the BGP tables of the standby BGP application 104B without modification. The same routing data, of course, is already stored in the BGP table of the active BGP application 104A.

Steps 214, 216 are repeated to send all BGP route information that is associated with a particular session hosted at the active route processor 102A. Further, as shown by step 218, the complete process of steps 204, 206, 208, 210, 212, 214, 216 repeats for each session that the active route processor 102A hosts. As a result, all pertinent BGP route information for all sessions is transferred to the standby route processor. The standby BGP application 104B then can create an Advertised Prefix Database based on the best routes received from the active BGP application 104A.

Steps 214, 216 are performed only for peer processors that do not have route refresh capability. If a route processor supports route refresh, then route refresh may be used in lieu of steps 214, 216.

Steps 208, 214 may be implemented using a new BGP state transfer message type that comprises a conventional BGP message encapsulated with a header that carries a connection identifier. The state transfer message may have the format shown in Table 1.

TABLE 1

TRANSFER MESSAGE TYPE

| <--4 bytes--> | <--2 bytes--> | <--2 bytes--> | <--up to 4096 bytes--> |
|---|---|---|---|
| Connection ID | Length | Flags | BGP Message |

The TCP and BGP elements of both the active route processor and standby route processor can continue regular activity with respect to other connections, sessions and updates while the process of FIG. 2, steps 203-218 is performed.

3.2 Other Observations and Implementation Details for Various Embodiments

The preceding approaches may be integrated into a complete system that provides stateful switchover of BGP processes even if asymmetric restart occurs. The disclosed approaches are much more efficient, scalable and maintainable than prior approaches. Embodiments reuse messages presently available in the BGP protocol, with extensions that support the use of BGP as a state transfer protocol for asymmetric startup synchronization.

Accordingly, the approaches herein can be used with network elements from different vendors that may implement the BGP protocol in slightly different ways. For example, because the approaches herein do not attempt to perform a bulk data transfer of the BGP routing tables, the approaches herein do not need to have a definition of the particular data structures that contain routing information in a specific BGP implementation, and there is no need to flatten such data structures and convert pointers. No checkpointing is needed, reducing bandwidth consumption across the IPC link. Therefore, for example, the approaches herein can be used when the active and standby BGP applications are from two different vendors, or in transfers of BGP information among different chassis, network device types, or operating system software releases, from the same or different vendors.

Further, a first network element can determine whether a second network element supports the approach herein by negotiating the availability of this approach as a BGP capability, using conventional capability negotiation mechanisms.

In one embodiment, the BGP messages that implement the approach are encapsulated in message headers that contain connection identifiers for efficient identification of sessions. Multiple messages for multiple sessions can be batched together. The disclosed approach also does not require the active BGP speaker and standby BGP speaker to represent the same software version or release, provided that each speaker supports identifying a session based on a connection identifier. The standby BGP speaker should comply with the BGP protocol so that it can understand the OPEN and UPDATE messages that are encapsulated in the state transfer messages that the active BGP speaker sends.

In one embodiment, an implementation modifies the BGP protocol by introducing a capability to signal that the standby BGP speaker should not apply inbound policy to messages received on a particular connection, and the capability to process a connection identifier to identify a session. Thus, a software implementation may use relatively simple code at the standby BGP application to process the state transfer messages. Such code may comprise conventional BGP UPDATE input processing code without inbound policy application code. Further, a software implementation of the state transfer mechanism at the active BGP application is also simple. In one embodiment, generating state transfer messages may use conventional BGP UPDATE generation code without outbound policy application code, and other modifications as indicated by the preceding description.

The approaches offer simplified deployment in a number of network scenarios. For example, in a network topology in which an Internet Service Provider maintains an MPLS-VPN network containing one or more route reflector (RR) nodes, one or more provider edge (PE) routers that are coupled across WAN links to customer edge (CE) routers, the approaches herein can be deployed in the PE and RR routers only, without upgrading the CE routers.

The preceding steps have described transferring BGP route or path update information. However, the same approach may be used to transferring less critical state information such as statistics, adaptive values for zero window transfers, etc. Standby BGP application 104B acts as a session endpoint for each session.

The approaches can be used with a large number of sessions and connections. No freezing of sessions or connections is needed.

After a switchover is completed using the foregoing techniques, the active and standby route processors and BGP applications may perform other ancillary operations. For example, the BGP applications may re-calculate best routes. The BGP application should process any dropped BGP WITHDRAW messages that occurred during switchover, by comparing then-current best routes against the Advertised Prefix Database, and sending a BGP WITHDRAW for any prefix that is in the APD but that is not among the best routes.

4.0 Implementation Mechanisms

Hardware Overview

Figure 4:
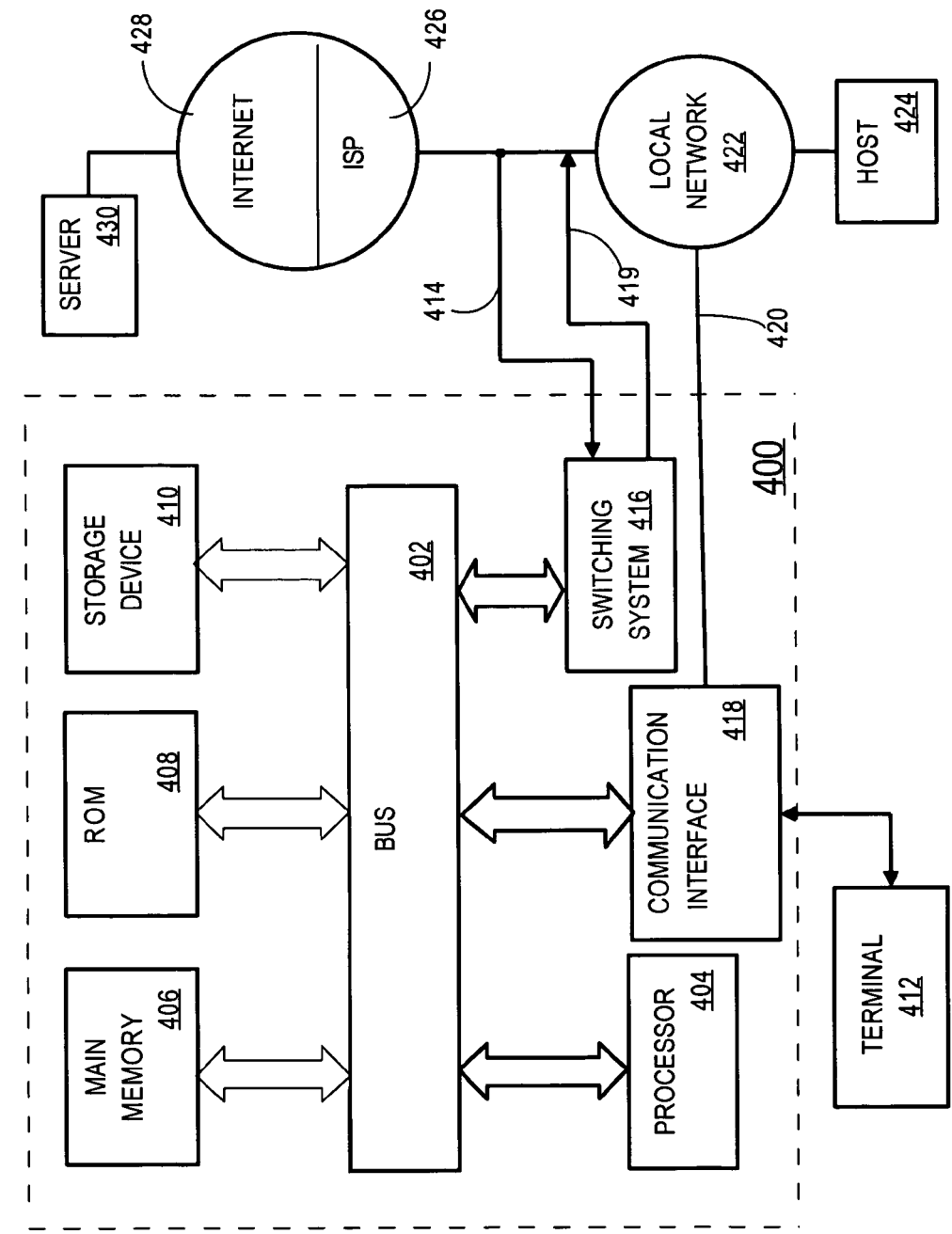
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands' to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for transferring BGP state information during asynchronous startup. According to one embodiment of the invention, transferring BGP state information during asynchronous startup is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for transferring BGP state information during asynchronous startup as described herein.

The received code may be executed by processor 404 as it is received, and/or stored in storage device 410, or other non-volatile storage for later execution.

5.0 Extensions and Alternatives

In the foregoing specification; the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the computer-implemented steps of:
    a first electronic digital data processor electronically transferring to a second electronic digital data processor, one or more transport layer connections associated with one or more application layer sessions;
    wherein the transport layer connections are between the first processor and a peer that is other than the first processor and second processor;
    sending, from the second processor to the first processor, a notification message requesting transfer of application session information;
    creating and sending, from the first processor to the second processor over an interprocess communication link, one or more application layer messages;
    wherein the application layer messages sent by the first processor cause the second processor to initiate a new application session with the peer as though the second processor received an application session initiation message over a TCP connection directly from the peer;
    wherein the peer does not participate in the initiation of said new application session;
    creating and sending, to the second processor, one or more application update messages that transfer application data from the first processor to the second processor;
    repeating the creating and sending steps for all application layer sessions that are active at the first processor.

2. A method as recited in claim 1, wherein the first processor creates and sends, to the second processor, a mapping of a unique connection identifier to one or more session identifier values, and wherein the application layer messages and application update messages include the unique connection identifier.

3. A method as recited in claim 2, wherein the unique connection identifier is an initial sequence number that is obtained from a transport layer.

4. A method as recited in claim 2, wherein each of the application layer messages and application update messages is encapsulated in a session transfer message that includes the unique connection identifier in a header field.

5. A method as recited in claim 1, wherein the application layer sessions are Border Gateway Protocol (BGP) sessions, and wherein the application layer messages comprise a BGP OPEN message.

6. A method as recited in claim 1, wherein the application layer sessions are Border Gateway Protocol (BGP) sessions, and wherein the application update messages are BGP UPDATE messages.

7. A method as recited in claim 6, wherein the application layer messages comprise a BGP OPEN message that duplicates another BGP OPEN message previously received from a BGP peer.

8. A method as recited in claim 1, wherein the first processor and the second processor are route processors in a fault-tolerant network element.

9. A method as recited in claim 8, wherein the network element is any of a router and a switch in a packet-switched network.

10. A computer system, comprising:
    a first electronic digital data processor;
    a second electronic digital data processor coupled to the first processor in a redundant configuration;
    a computer-readable medium coupled to the first processor and comprising one or more sequences of instructions which, when executed by the first processor, cause the first processor to perform the steps of:
    electronically transferring, to the second processor, one or more transport layer connections associated with one or more application layer sessions;
    wherein the transport layer connections are between the first processor and a peer that is other than the second processor;
    sending, from the second processor to the first processor, a notification message requesting transfer of application session information;
    creating and sending, from the first processor to the second processor over an interprocess communication link, one or more application layer messages;
    wherein the application layer messages sent by the first processor cause the second processor to initiate a new application session with the peer as though the second processor received an application session initiation message over a TCP connection directly from the peer;
    wherein the peer does not participate in the initiation of said new application session;
    creating and sending, to the second processor, one or more application update messages that transfer application data from the first processor to the second processor;
    repeating the creating and sending steps for all application layer sessions that are active at the first processor.

11. A computer system as recited in claim 10, wherein the first processor creates and sends, to the second processor, a mapping of a unique connection identifier to one or more session identifier values, and wherein the application layer messages and application update messages include the unique connection identifier.

12. A computer system as recited in claim 11, wherein the unique connection identifier is an initial sequence number that is obtained from a transport layer.

13. A computer system as recited in claim 11, wherein each of the application layer messages and application update messages is encapsulated in a session transfer message that includes the unique connection identifier in a header field.

14. A computer system as recited in claim 10, wherein the application layer sessions are Border Gateway Protocol (BGP) sessions, and wherein the application layer messages comprise a BGP OPEN message.

15. A computer system as recited in claim 10, wherein the application layer sessions are Border Gateway Protocol (BGP) sessions, and wherein the application update messages are BGP UPDATE messages.

16. A computer system as recited in claim 15, wherein the application layer messages comprise a BGP OPEN message that duplicates another BGP OPEN message previously received from a BGP peer.

17. A computer system as recited in claim 10, comprising any of a router and a switch in a packet-switched network.

18. A non-transitory computer-readable volatile or non-volatile medium, coupled to a first processor and a second processor that are coupled to one another in a redundant configuration, comprising one or more sequences of instructions which, when executed by the first processor, cause the first processor to perform the steps of:
electronically transferring, to the second processor, one or more transport layer connections associated with one or more application layer sessions;
wherein the transport layer connections are between the first processor and a peer that is other than the second processor;
sending, from the second processor to the first processor, a notification message requesting transfer of application session information;
creating and sending, from the first processor to the second processor over an interprocess communication link, one or more application layer messages;
wherein the application layer messages sent by the first processor cause the second processor to initiate a new application session with the peer as though the second processor received an application session initiation message over a TCP connection directly from the peer;
wherein the peer does not participate in the initiation of said new application session;
creating and sending, to the second processor, one or more application update messages that transfer application data from the first processor to the second processor;
repeating the creating and sending steps for all application layer sessions that are active at the first processor.

19. The non-transitory computer-readable volatile or non-volatile medium as recited in claim 18, wherein the first processor creates and sends, to the second processor, a mapping of a unique connection identifier to one or more session identifier values, and wherein the application layer messages and application update messages include the unique connection identifier.

20. The non-transitory computer-readable volatile or non-volatile medium as recited in claim 19, wherein the unique connection identifier is an initial sequence number that is obtained from a transport layer.

21. The non-transitory computer-readable volatile or non-volatile medium as recited in claim 19, wherein each of the application layer messages and application update messages is encapsulated in a session transfer message that includes the unique connection identifier in a header field.

22. The non-transitory computer-readable volatile or non-volatile medium as recited in claim 18, wherein the application layer sessions are Border Gateway Protocol (BGP) sessions, and wherein the application layer messages comprise a BGP OPEN message.

23. The non-transitory computer-readable volatile or non-volatile medium as recited in claim 18, wherein the application layer sessions are Border Gateway Protocol (BGP) sessions, and wherein the application update messages are BGP UPDATE messages.

24. The non-transitory computer-readable volatile or non-volatile medium as recited in claim 23, wherein the application layer messages comprise a BGP OPEN message that duplicates another BGP OPEN message previously received from a BGP peer.

25. The non-transitory computer-readable volatile or non-volatile medium as recited in claim 18, wherein the first processor and the second processor are route processors in a fault-tolerant network element.

26. The non-transitory computer-readable volatile or non-volatile medium as recited in claim 25, wherein the network element is any of a router and a switch in a packet-switched network.

27. A method of transferring Border Gateway Protocol (BGP) state information during asynchronous startup of BGP hosts, comprising the computer-implemented steps of:
electronically transferring, from a first electronic digital data processor acting as a BGP host to a second electronic digital data processor acting as a redundant BGP host, one or more transport layer connections associated with one or more BGP sessions;
wherein the transport layer connections are between the first processor and a peer that is other than the second processor;
allocating a connection identifier for uniquely identifying a new BGP session;
sending, from the second processor to the first processor, a notification message requesting transfer of BGP session information;
creating and sending, from the first processor to the second processor, a mapping of transport protocol parameter values to the connection identifier, wherein the transport protocol parameter values are associated with one of the transport layer connections;
creating and sending, from the first processor to the second processor over an interprocess communication link, one or more BGP session initiation messages;
wherein the application layer messages sent by the first processor cause the second processor to initiate a new BGP session with the peer as though the second processor received a BGP OPEN message or a BGP ORG message over a TCP connection directly from the peer;
wherein the peer does not participate in the initiation of said new BGP session;
creating and sending, to the second processor, one or more BGP UPDATE messages that transfer application data from the first processor to the second processor, wherein each of the BGP UPDATE messages identifies an associated transport layer connection using the connection identifier and not the transport protocol parameter values;
repeating the creating and sending steps for all BGP sessions that are active at the first processor.

28. A method as recited in claim 27, wherein the second processor receives the one or more BGP UPDATE messages, determines a BGP session associated with the messages based on the connection identifier, and updates one or more BGP tables associated with the BGP session based on the BGP UPDATE messages.

* * * * *